(12) United States Patent
Srutkowski

(10) Patent No.: US 8,945,312 B2
(45) Date of Patent: Feb. 3, 2015

(54) BRISTLE BASED FIBER OPTIC CONNECTOR CLEANER SUB-SURFACE

(75) Inventor: Lawrence Srutkowski, Greenville, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 171 days.

(21) Appl. No.: 13/519,016

(22) PCT Filed: Dec. 23, 2010

(86) PCT No.: PCT/US2010/061983
§ 371 (c)(1),
(2), (4) Date: Oct. 5, 2012

(87) PCT Pub. No.: WO2011/079254
PCT Pub. Date: Jun. 30, 2011

(65) Prior Publication Data
US 2013/0019423 A1   Jan. 24, 2013

Related U.S. Application Data

(60) Provisional application No. 61/289,439, filed on Dec. 23, 2009.

(51) Int. Cl.
*B08B 1/00* (2006.01)
*B08B 11/00* (2006.01)
*G02B 6/38* (2006.01)

(52) U.S. Cl.
CPC . *B08B 1/00* (2013.01); *B08B 11/00* (2013.01); *G02B 6/3807* (2013.01); *B08B 2240/02* (2013.01)

USPC ......... 134/6; 15/210.1; 15/104.93; 15/104.94

(58) Field of Classification Search
CPC ...... B08B 2240/02; B08B 1/00; B08B 11/00; B08B 1/001–1/007; G02B 6/3807; G02B 6/3866
USPC ........ 15/210.1, 104.93, 104.94, 244.3, 244.4, 15/247, 104.92, 231, 232, 186–188
See application file for complete search history.

(56) References Cited

U.S. PATENT DOCUMENTS

| 494,872 | A | * | 4/1893 | Lloyd | 15/231 |
|---|---|---|---|---|---|
| 2,414,321 | A | * | 1/1947 | Miller | 15/188 |
| 2,500,840 | A | * | 3/1950 | Lyons et al. | 15/231 |
| 2,666,221 | A | * | 1/1954 | Stepper | 15/146 |
| 2,704,375 | A | * | 3/1955 | Haeusser | 15/104.94 |

(Continued)

FOREIGN PATENT DOCUMENTS

| JP | 2005-189730 A | 7/2005 |
|---|---|---|
| WO | 2004/010189 A1 | 1/2004 |

OTHER PUBLICATIONS

International Search Report for PCT/US2010/061983 dated Mar. 21, 2011.

*Primary Examiner* — Mark Spisich
*Assistant Examiner* — Andrew A Horton
(74) *Attorney, Agent, or Firm* — Sughrue Mion, PLLC

(57) ABSTRACT

A fiber optic connector cleaner including a base, a brush-like subsurface with a top surface, including a plurality of bristles, connected to said base, and a fiber optic connector cleaning material on said top surface of said brush-line subsurface, wherein said bristles are movable to allow gaps to be created, while still maintaining a top surface.

8 Claims, 3 Drawing Sheets

(56) References Cited

U.S. PATENT DOCUMENTS

| | | | |
|---|---|---|---|
| 4,184,221 A * | 1/1980 | Edwards | 15/114 |
| 5,072,479 A * | 12/1991 | Van Niekerk | 15/111 |
| 5,438,728 A * | 8/1995 | Kubes et al. | 15/180 |
| 5,930,862 A * | 8/1999 | Garrett | 15/200 |
| 6,389,637 B1 * | 5/2002 | Hurell | 15/247 |
| 6,769,150 B1 | 8/2004 | Liu et al. | |
| 6,854,153 B1 * | 2/2005 | Mueller | 15/210.1 |
| 6,975,803 B2 | 12/2005 | Koide et al. | |
| 2002/0166187 A1 * | 11/2002 | Rowe | 15/160 |
| 2002/0190737 A1 * | 12/2002 | Maekawa et al. | 324/754 |
| 2007/0124883 A1 | 6/2007 | Forest | |
| 2007/0256261 A1 * | 11/2007 | Benitez et al. | 15/118 |
| 2008/0282489 A1 * | 11/2008 | Monahan et al. | 15/228 |
| 2009/0100623 A1 | 4/2009 | Blair | |
| 2009/0282633 A1 * | 11/2009 | Fuller et al. | 15/160 |
| 2010/0017992 A1 * | 1/2010 | Sgroi et al. | 15/210.1 |
| 2010/0205758 A1 * | 8/2010 | Levitt et al. | 15/105 |

* cited by examiner

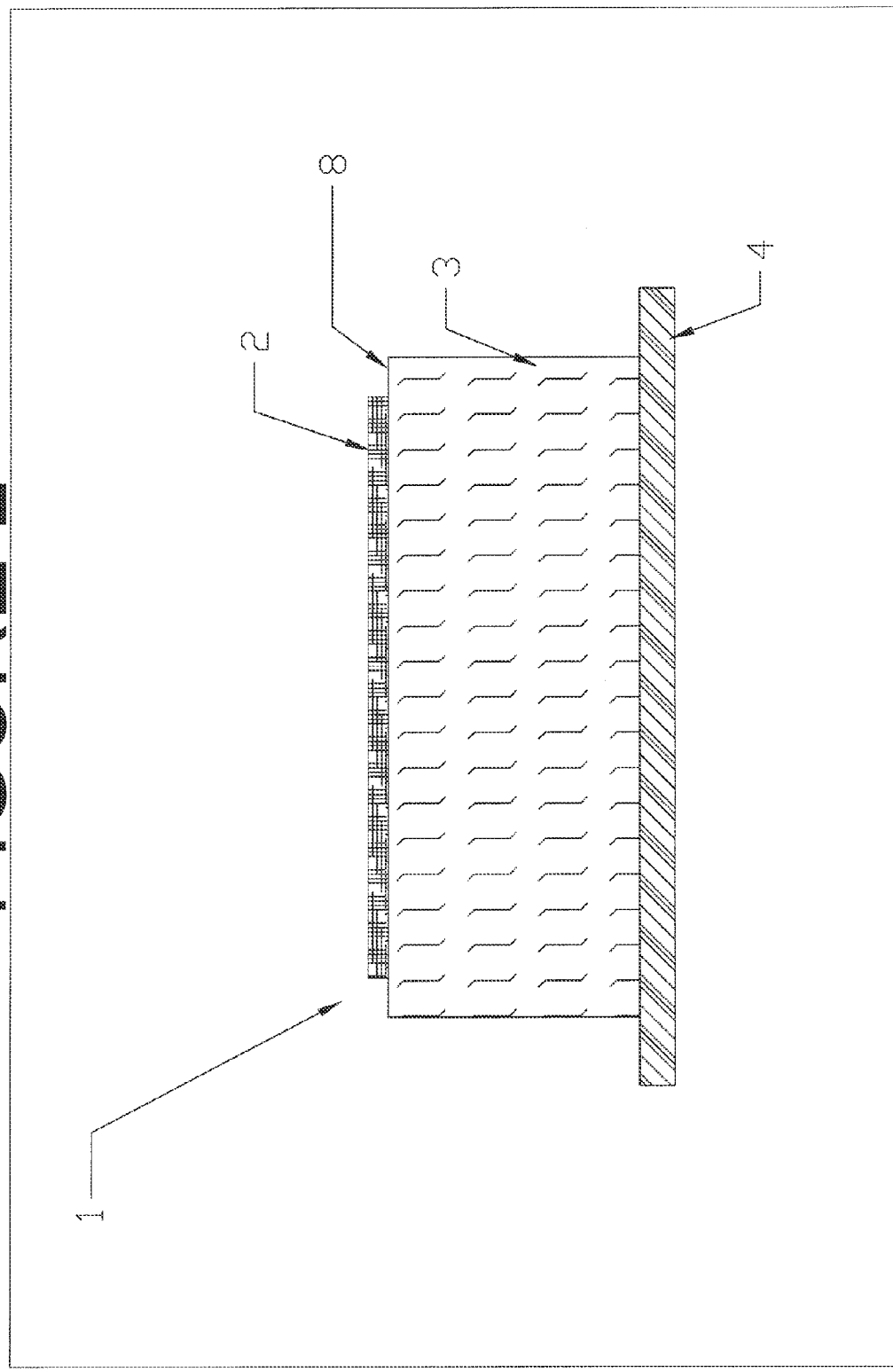

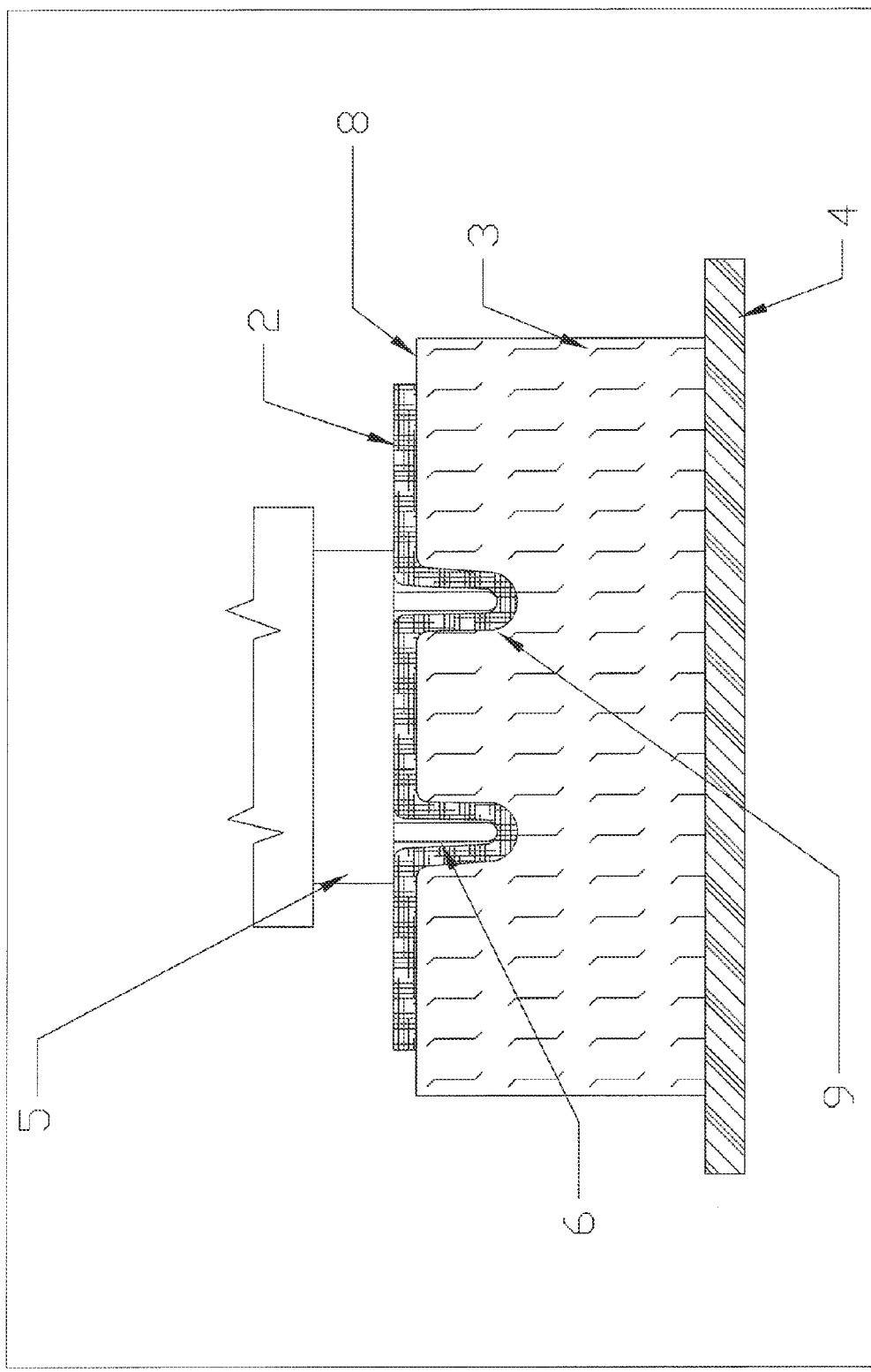

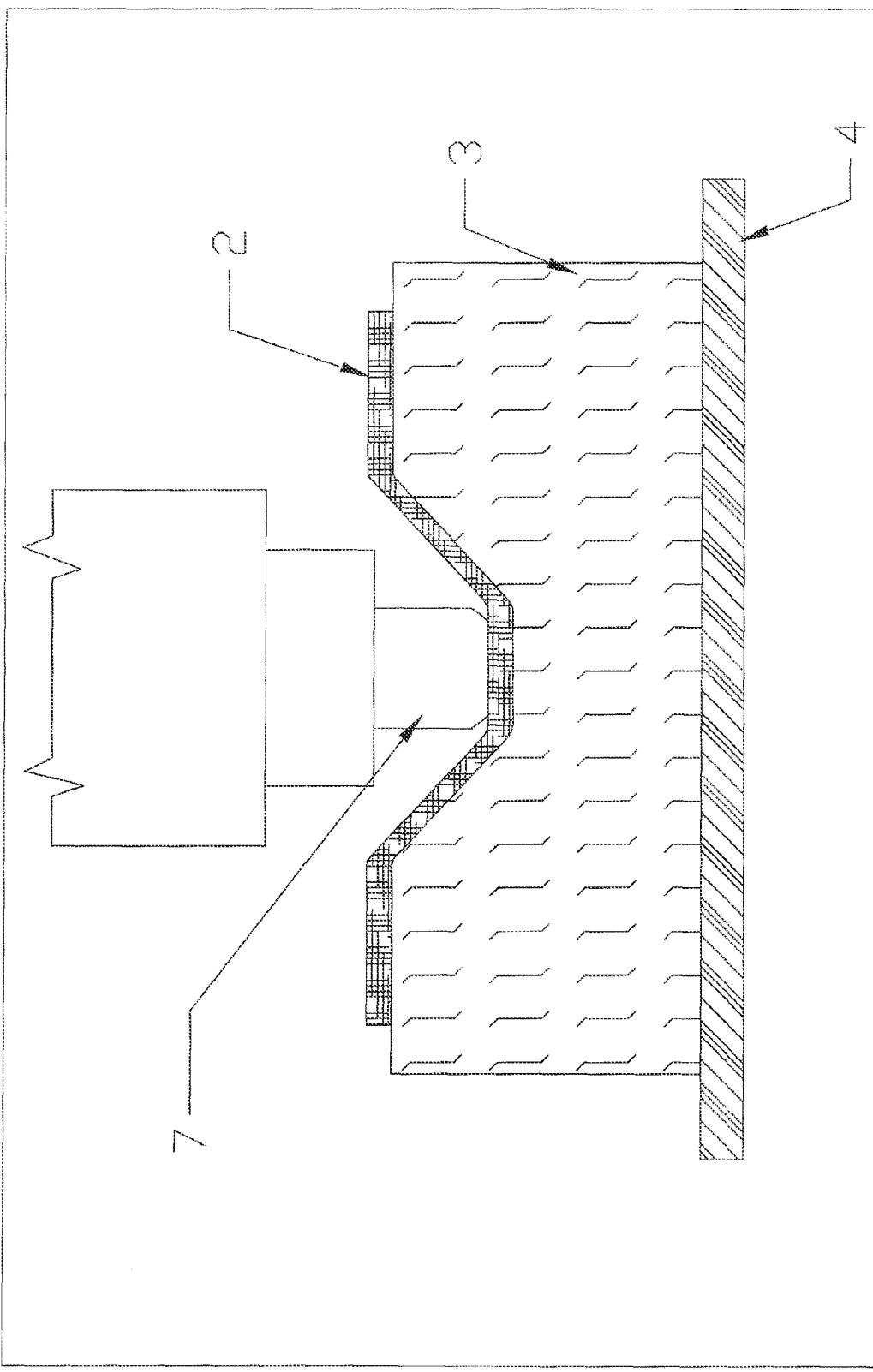

BRISTLE BASED FIBER OPTIC CONNECTOR CLEANER SUB-SURFACE

CROSS-REFERENCE TO RELATED APPLICATIONS

This application is based upon and claims the benefit of priority from U.S. Provisional Application No. 61/289,439, filed Dec. 23, 2010 in the United States Patent and Trademark Office, the disclosure of which is incorporated herein in its entirety by reference.

BACKGROUND OF THE INVENTION

1. Field of the Invention

The invention relates to a fiber optic connector cleaner. More particularly, it relates to a fiber optic connector cleaner that includes a brush-like subsurface structure.

2. Background

Current fiber optic connector cleaners commonly use a rubber sub-surface below the micro fiber cleaning material to provide a support surface to press against when cleaning the connectors. For MT connectors containing guide pins (male MT connectors) this necessitates the use of a protrusion or cut to provide a clearance for the pins. As such, careful design and manufacturing must be maintained to guarantee that the cleaner will clean all of the protruding fibers from an MT ferrule without damaging or hindering the movement of the guide pins. See for example, U.S. Pat. No. 6,415,471.

Conventional cleaners, such as the ones disclosed in U.S. Pat. No. 6,415,471, which use an male-style MT cleaner on a female-style connector, require care such that the fiber contact area and region immediately surrounding stay in constant contact with the section of the cleaning material that is directly in contact with the "rail" feature of the sub-surface. Failure to do so can result in incomplete cleaning. Similar care must be taken when using a male-style cleaner with a single fiber ferrule.

Other problems include with conventional cleaners include the need to keep two or three cleaners in a kit in order to have a cleaner for male MT, female MT, and single fiber cleaning. In addition, non-standard connectors or connectors that are designed to a standard that is not commonly used may be difficult to clean on a cleaner using one of the more common sub-surface styles.

BRIEF SUMMARY OF THE INVENTION

An object of the invention is to provide a single solution to the need for a variety of sub-surfaces for cleaning fiber optic connector/ferrule end faces.

A first embodiment of the fiber optic connector cleaner includes a base, a brush-like subsurface with a top surface, including a plurality of bristles, connected to said base, and a fiber optic connector cleaning material on said top surface of said brush-line subsurface, wherein said bristles are movable to allow gaps to be created, while still maintaining a top surface.

BRIEF DESCRIPTION OF THE DRAWINGS

The above and other objects, features and advantages of the invention will become more apparent by describing in detail exemplary embodiments thereof with reference to the attached drawings in which:

FIG. 1 shows an embodiment of the invention.

FIG. 2 shows an example of the cleaner being used with an MT connector.

FIG. 3 shows an example of the cleaner being used with a single ferrule connector.

DETAILED DESCRIPTION OF EXEMPLARY EMBODIMENTS OF THE INVENTION

Exemplary embodiments of the invention will now be described below by reference to the attached Figures. The described exemplary embodiments are intended to assist the understanding of the invention, and are not intended to limit the scope of the invention in any way.

Referring to FIGS. 1 and 2, this new cleaner uses a brush-like subsurface to provide the support structure for the cleaning material. FIG. 1 shows an embodiment of the cleaner 1. Cleaner 1 includes a fiber optic connector cleaning material 2. Examples of fiber optical cleaning materials include cotton or synthetic based, woven material that is low-lint (used dry). Kimwipes can also be used as well as cotton swabs (in both cases, they are wet by applying Isopropyl alcohol). However, the invention is not limited to these specific cleaning materials.

Cleaner 1 also includes a brush-like subsurface 3 that is made up of a plurality of individual bristles, the ends of which form a top surface 8, which provide support for the fiber optic connector cleaning material 2. Examples of bristles include synthetic fibers (nylon, polypropylene, polyester, silicate, aluminum oxide, etc.), natural animal hairs (horse, goat, etc), natural fibers (Tampico) or metal wires (steel, brass, bronze, etc). However, the invention is not limited to these specific bristles.

Using smaller bristles, where the bristle diameter dimension is significantly smaller than the nominal connector surface diameter/width, will allow a more complete support for the ferrule for cleaning. In addition, each bristle can be individually connected to the base 4 of the brush, thereby allowing each bristle to bend separate from the other bristles and form gaps 9. However, the individual bristles do not need to be individually connected to the base 4 as long the means for connection allows the bristles to bend separate from the other bristles and form gaps 9. Materials that can be used for the base include metal (steel, brass, bronze, aluminum, etc.), plastic (PET, PVC, PBT, etc), rubber, or wood. However, the invention is not limited to these specific base materials.

FIG. 2 shows a fiber optic connector ferrule 5 (in this embodiment, it is a male MT ferrule). The motion of the bristles allows the connector guide pins 6, which are typically a small diameter, and fiber optic connector cleaning material 2, to slip between the gaps 9 in the bristles. However, despite the movement of the bristles, the bristles still maintain a top surface 8 that supports the cleaning of the connector. This movement also eliminates the need for a protrusion or slots to be created. Also, when a wide fiber optic connector cleaning material is used, this design allows for the cleaning of the guide pins 6 in addition to the cleaning of the ferrule 5, such as an MT ferrule.

FIG. 3 shows the cleaner being used to clean a single fiber ferrule fiber optic connector 7.

Since all of the support for the surface comes from the structure of the brush, this cleaning sub-surface would be equally usable on a male or female ferrule of any design where the ferrule of the connector protrudes up to or beyond the front of the connector body.

One advantage of this design is that it allows for an alternative sub-surface for cleaning fiber optic ferrules without the need for a specialized subsurface designed for a particular variety of connector.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A method of cleaning a fiber optic connector using a fiber optic connector cleaner, the fiber optic connector cleaner comprising:
   a base;
   a subsurface with a top surface, including a plurality of bristles, connected to said base; and
   a fiber optic connector cleaning material on said top surface of said subsurface;
   wherein said bristles are movable to allow gaps to be created, while still maintaining said top surface;
   the method comprising:
   pressing the fiber optic connector against the fiber optic connector cleaning material.

2. The method of claim 1, wherein said fiber optic connector cleaning material is a dry, low-lint material.

3. The method of claim 1, wherein said fiber optic connector cleaning material is a wet wipe.

4. The method of claim 1, wherein said bristles are synthetic fibers.

5. The method of claim 1, wherein said bristles are natural animal hairs.

6. The method of claim 1, wherein said bristles are natural fibers.

7. The method of claim 1, wherein said bristles are metal wires.

8. The method of claim 1, wherein said bristles, in use, do not pass through the fiber optic connector cleaning material.

* * * * *